Dec. 26, 1967          J. C. EVERITT               3,359,812
          ANGLE ADJUSTING MECHANISM FOR OPTICAL ELEMENTS
Filed March 13, 1964                              2 Sheets-Sheet 2
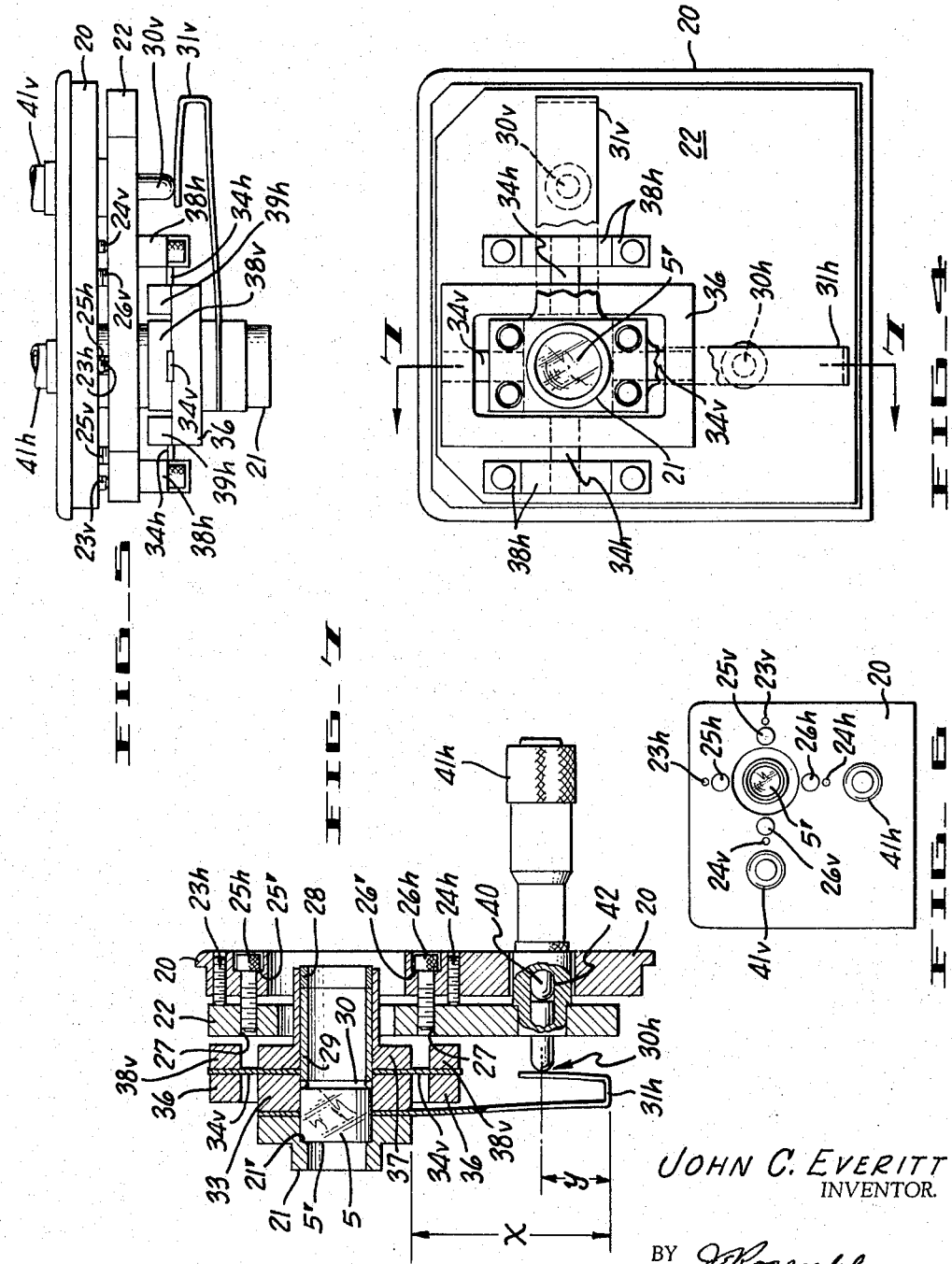
JOHN C. EVERITT
INVENTOR.
BY J. Rosenblum
ATTORNEY United States Patent Office 3,359,812
Patented Dec. 26, 1967

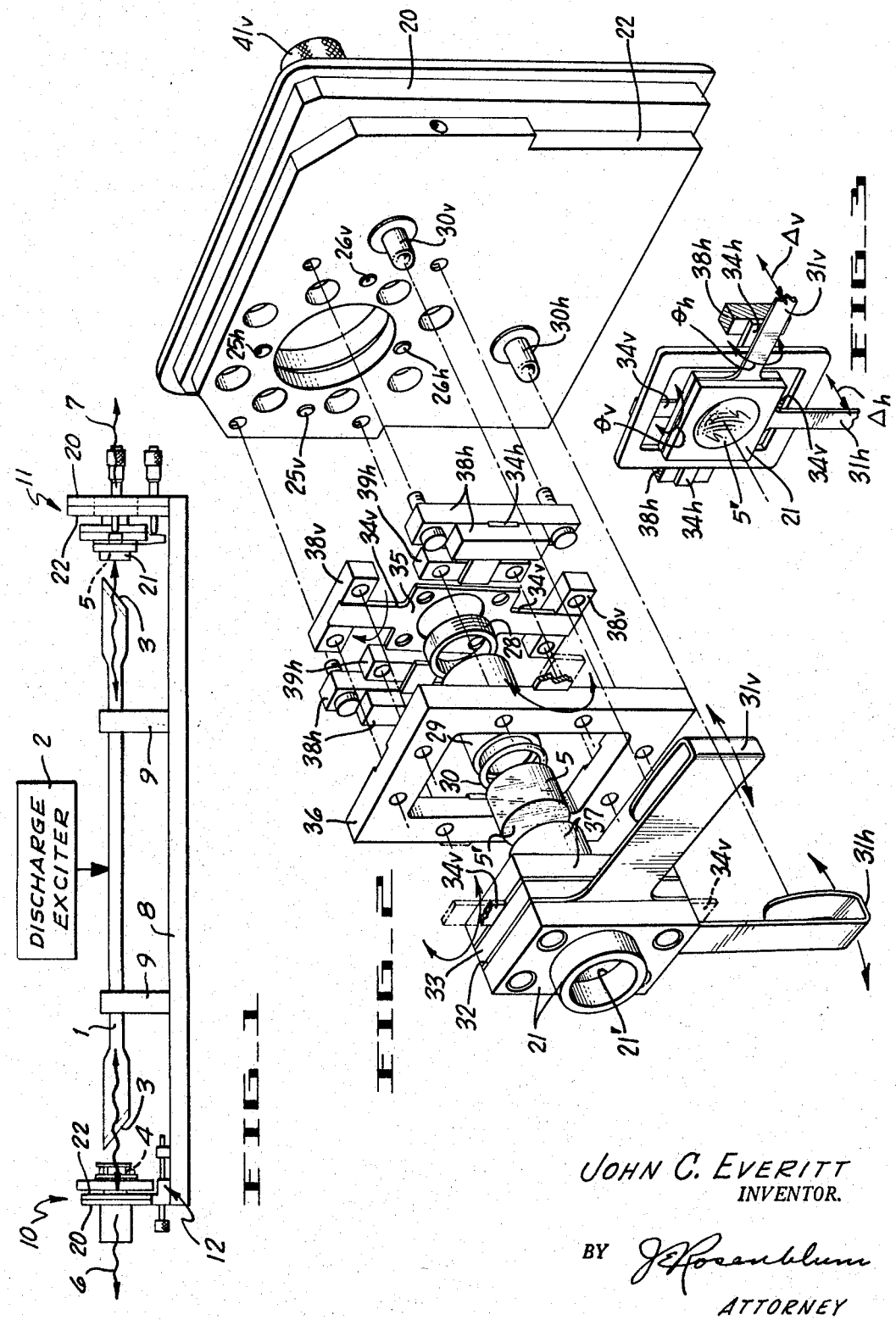

3,359,812
ANGLE ADJUSTING MECHANISM FOR OPTICAL ELEMENTS
John C. Everitt, San Jose, Calif., assignor to Spectra-Physics, Inc., Mountain View, Calif., a corporation of California
Filed Mar. 13, 1964, Ser. No. 351,661
8 Claims. (Cl. 74—89.15)

The present invention relates in general to optical elements (including reflectors and lenses), and more particularly to novel mechanisms for making precise angular adjustments of such elements.

One field in which the present invention is of particular importance is that of lasers (or optical masers). In a laser, an active medium of quantum resonant particles is excited to emit optical radiation and a Fabry-Perot interferometer, comprising a pair of optically-facing reflectors (or mirrors), functions as an optical resonator by reflecting radiation of a particular wavelength several times back and forth through the active medium. The reflected wavelength corresponds to the separation between two discrete energy levels of the medium so that particles in the upper energy level are stimulated to emit synchronously-phased radiation of this wavelength and undergo transitions to the lower energy level. When the stimulated emission gain due to an excess particle population in the upper state (population inversion) overcomes all losses, laser oscillation is established, and a coherent radiation output obtained, at the reflected wavelength. For more detailed discussions, reference is made to Applied Optics, 1962 Supplement on Optical Masers.

Proper operation of a laser depends on precise and stable angular alignment of the interferometer reflectors. For example, in a resonator comprising two parallel flat reflectors, the reflectors must be parallel to within about one arc second in order to prevent the radiation from "walking" off the reflectors before experiencing sufficient stimulated emission gain for laser oscillation. As a further example, in a resonator comprising one flat reflector and one spherical reflector (hemispherical resonator), the radiation pattern is focussed to a point on the flat resonator. Although the alignment requirements for laser oscillation in this case are not as severe as those for the two flat reflectors, it is desirable to have a precision angle adjustment for the spherical reflector which will permit the spot focus to be positioned at a point on the flat reflector which optimizes the power output and/or which is free of any surface imperfection which would prohibit the attainment of a uniphase output waveform.

It is also most desirable that an optical element angle adjusting mechanism provide independent rotational movement about perpendicular axes. The availability of such orthogonal adjustments insures that a desired angular setting can be made quickly and reproducibly.

One feature of the present invention is the provision of a dual set screw mechanism for permitting rugged and stable orthogonal angular adjustments of an optical element.

Another feature of the present invention is the provision of a micrometer-driven leaf spring mechanism for producing fine angular adjustment of an optical element by elastic twisting of rigidly-secured torsion members.

Another feature of the present invention is the provision of a micrometer structure for driving a torsion-type angle adjusting mechanism for an optical element in which the driving spindle is non-rotatable so as to preclude transmission of non-orthogonal bending moments.

These and other features and advantages of the present invention will become apparent upon a consideration of the following detailed specification taken in connection with the accompanying drawing, wherein:

FIGURE 1 is an elevational view of a typical laser embodying a reflector angle adjusting mechanism in accordance with the present invention;
FIGURE 2 is an exploded perspective view of an angle adjustment mechanism for an optical element in accordance with the present invention;
FIGURE 3 is a simplified perspective view of a portion of the angle adjustment mechanism of FIGURE 2;
FIGURE 4 is a front view of the angle adjustment mechanism of FIGURE 2;
FIGURE 5 is a top view of the angle adjustment mechanism of FIGURE 2;
FIGURE 6 is a rear view of the angle adjustment mechanism of FIGURE 2; and
FIGURE 7 is a cross-sectional view taken along line 7—7 of FIGURE 4.

Referring to FIGURE 1, a typical laser includes a plasma tube 1 filled with a gas mixture of 90% helium and 10% neon at a pressure of about 1 torr, and excited to optical emission by means of a power source 2 which excites an electrical discharge in the gas. The axially propagated radiation is directed, via windows 3 inclined at Brewster's angle for maximum transmission, to interferometer reflectors 4 and 5 which reflect the radiation back and forth a sufficient number of times to sustain laser oscillation. For a helium-neon laser, typical oscillation wavelengths are 6328 A., 11,523 A., or 33,912 A., the particular wavelength being determined by the peak reflectivity of the reflectors. The small transmission through the reflectors at the oscillation wavelength constitutes the output beams 6 and 7.

The laser base 8 carries plasma tube supports 9, coarse angle adjustment mount 10 for reflector 4, and coarse and fine angle adjustment mount 11 for reflector 5. Mount 10 is supported via dovetail slide assembly 12 which permits adjustments to be made in the separation between the reflectors 4 and 5.

The detailed construction of the angle adjusting mechanism 11 is shown in detail in FIGURES 2 through 6.

The coarse angle adjusting mechanism, on each of the mounts 10 and 11, comprises a fixed vertical end plate 20 to which the reflector housing 21 is attached via mounting plate 22 and four pairs of set screws which join the plates 20 and 22. Rotation about the horizontal axis is provided by set screw pairs 23h, 24h and 25h, 26h; and orthogonal rotation about the vertical axis is provided by corresponding set screws 23v, 24v, and 25v, 26v.

Operation of this mechanism is best understood by reference to FIGURE 7 which is a cross section taken along the vertical axis. The cross section taken along the horizontal axis would look exactly the same. The outer screws 23h, 24h bear directly against mounting plate 22 so as to move the plate inwards; and the inner screws 25h, 26h bear against shoulders 25', 26', thereby being captured against translation, and screw into threaded mounting plate holes 27 so as to move the plate 22 outwards. The cylindrical-shaped reflector 5 is retained inside the apertured reflector housing 21, with end reflecting surface 5' against housing shoulder 21', by means of retaining ring 28 which threads into the opposite end of the opening in housing 21 and exerts pressure on the reflector via spacer 29 and rubber O-ring 30.

Suppose, for example, that it is desired to rotate the lower part of the reflecting surface 5' inwardly about the horizontal axis. Inner screws 25h and 26h are first loosened approximately one-quarter turn. Then outer screw 23h is loosened, and outer screw 24h tightened a corresponding amount to achieve the desired rotation. Finally the inner screws 25h and 26h are tightened to lock the mounting plate 22 in position. While all these adjustments are being made, the four set screws for the other axis of rotation remain tight.

The above mechanism is sufficient to permit stable laser oscillation with a hemispherical resonator. However, for greater flexibility of operation, and to permit the maximization of power in a desired radiaton pattern, a micrometer-driven fine angle adjustment mechanism is provided on the mount 11.

The mechanism for effecting fine angle rotation about the vertical axis comprises a micrometer spindle 30v which exerts a force on the free end of the horizontally-extending folded leaf spring 31v which is an integral part of an apertured plate 32. The plate 32 is clamped by apertured block 33 to the reflector housing 21 so that twisting torque is exerted in the vertical torsion strips 34v the respective ends of which are secured to the housing 21 and a surrounding rigid yoke 36, the strips 34v being an integral part of an apertured plate 35 clamped to housing 21 by block 33 and aperture-block 37, and the outer ends of strips 34v being clamped to the yoke 36 by blocks 38v. Similarly, the mechanism for effecting fine angle rotation about the horizontal axis comprises a micrometer spindle 30h which exerts a force on the free end of the vertically-extending folded leaf spring 31h also an integral part of the plate 32 clamped to the reflector housing 21, thereby exerting a twisting torque in the horizontal torsion strips 34h the opposite ends of which are secured to mounting plate 22 and yoke 36 by blocks 38h and 39h, respectively.

Operation of the fine angle adjusting mechanism is best understood by reference to FIGURE 2. Linear deflection of leaf spring 31v by an amount $\Delta_v$ creates a twisting torque or moment whereby the reflector housing 21 is rotated through angle $\theta_v$ about the vertical axis within rigid yoke 36 by means of the twisting of torsion strips 34v; and linear deflection of leaf spring 31h by an amount $\Delta_h$ creates a torque whereby the yoke 36, and hence the reflector housing 21 attached thereto, is rotated through angle $\theta_h$ about the horizontal axis by means of the twisting of horizontal torsion strips 34h. The spring constant of the leaf springs 31v, 31h is small compared to that of the corresponding torsion strips 34v, 34h to yield a differential reduction whereby a reasonable amount of micrometer motion results in a high resolution fine angular adjustment. For example, with beryllium copper leaf springs 31 approximately 2" long by 9/16 inch wide by .020 inch thick; and tool steel torsion strips 34 approximately 5/8 inch long by 1/4 inch wide by 1/16 inch thick, the ratio $\theta/\Delta$ is one arc second of reflector rotation for each mil (.001 inch) of micrometer movement. With a typical micrometer resolution of 0.1 mil, the resulting resolution in angular rotation is 0.1 arc second. The deformations are within the elastic limit of the materials so that sticking friction is eliminated and repeatability is assured.

As can be seen in FIGURE 7, the leaf springs 31 are of a folded configuration of over-all length $x$ and effective folded back length (to the point of contact with micrometer spindle) $y$. With the ratio $y/x$ equal to $(\sqrt{2}-1)$, or approximately 0.414, the deflections of the principal and folded back portions of the leaf spring 31 compensate so that at all positions of the micrometer travel, the angle of attack between the point of contact of the leaf spring and the micrometer spindle remains a right angle. This insures that no component of force exists along the length of the leaf spring. Such a component would apply an unwanted and variable torque on the torsion strips 34, and thereby introduce a non-linearity in the relationship between micrometer travel $\Delta$ and reflector rotation $\theta$.

Another important feature of the angle adjustment mechanism of the present invention, insuring independence between the horizontal and vertical adjustments, is that the driving micrometer spindles 30v and 30h do not rotate, thereby preventing spring 31v from transmitting a non-orthogonal twisting torque to torsion strips 34h and preventing spring 31h from transmitting a non-orthogonal twisting torque to torsion strips 34v. This is accomplished by having these driving spindles separated from the rotating spindles 40 of the conventional micrometers 41v and 41h, as seen in FIGURE 7. Since the area of contact between the rounded end of the spindle 40 and the flat end of the spindle 30v or 30h is many orders of magnitude less than the bearing area between the spindle 30v or 30h and the wall 42 of the corresponding micrometer housing, the active spindles 30v and 31v do not rotate as the micrometers 41v and 41h are adjusted.

The above-described angle adjustment mechanism, in addition to its application to laser resonators, is also useful for reflectors used in conventional passive interferometers. In this case the orthogonal micrometer adjustments permit precise two-axis positioning and scanning of the usual fringe displays. Still further, the described system is of importance in the precise positioning of reflectors and lenses in any optical system where it is desired to minimize the various wave-distorting effects (aberrations) due to misalignment of the optical elements.

I claim:

1. An angle adjusting mechanism for an optical element, comprising: a fixed plate; a mounting plate positioned substantially parallel to said fixed plate and having means secured thereto for holding an optical element; and four pairs of set screws joining said fixed plate and said mounting plate, two of said pairs being aligned along a first direction and two of said pairs being aligned along a second direction which is perpendicular to said first direction, one pair of set screws along each direction extending through said fixed plate in threaded relation therewith and bearing against said mounting plate whereby rotation of said screws effects movement of said mounting plate away from said fixed plate, and one pair of set screws along each direction extending through said fixed plate in translation-captured relation therewith and being threadedly engaged in said mounting plate whereby rotation of said screws effects movement of said mounting plate towards said fixed plate.

2. An angle adjusting mechanism according to claim 1 wherein said optical element holding means comprises an optical element housing positioned within a rigid yoke and attached thereto by means of torsion members extending between said housing and said yoke in one of said perpendicular directions, said yoke being attached to said mounting plate by means of torsion members extending in the other of said perpendicular directions, and further including means for selectively applying twisting torques to the torsion members extending in each of said directions to thereby provide orthogonal fine angular adjustment of said optical element housing.

3. An angle adjusting mechanism according to claim 2 wherein said torque applying means comprises a pair of leaf springs attached at one end thereof to said optical element housing and extending along each of said perpendicular directions; and a pair of micrometer mechanisms for driving the free end of said leaf springs normal to plane defined by said perpendicular directions, the spring constant of said leaf springs being small compared to that of said torsion members whereby translation of said micrometer mechanism results in a small twisting of said torsion members.

4. An angle adjusting mechanism according to claim 3 wherein said leaf springs are folded back at the free ends thereof, and said micrometer mcehanisms drive said leaf springs at a point on the folded back portions thereof which is substantially 0.414 times the distance between the point at which said leaf spring attaches to said reflector housing and the point at which said leaf spring is folded back, thereby maintaining the angle of attack between said micrometer mechanisms and said leaf springs at a right angle for all positions of adjustment in order to insure a linear relationship between the translation of said micrometer mechanisms and the twisting of said torsion members.

5. An angle adjusting mechanism according to claim 4 wherein each of said micrometer mechanisms comprises a rotating spindle, a driving spindle which is axially aligned with and separated from said rotating spindle, and a housing coaxial with and in bearing relationship with said spindles, said spindles making contact with each other over an area which is small compared to the area of bearing contact between said driving spindle and said housing whereby said driving spindle does not rotate as it is axially translated, thereby insuring that each leaf spring envelopes a twisting torque about the torsion members extending in a single one of said perpendicular directions.

6. An angle adjusting mechanism for an optical element, comprising: a rigid yoke; an optical element housing positioned within said yoke and attached thereto by means of torsion members extending in one of two perpendicular directions; a fixed mounting member to which said yoke is attached by means of torsion members extending in the other of said perpendicular directions; a pair of leaf springs attached at one end thereof to said optical element housing and extending along each of said perpendicular directions; and means for driving the other ends of said leaf springs normal to the plane defined by said perpendicular directions, the spring constant of said leaf springs being small compared to that of said torsion members whereby the driving of each of said leaf springs results in a selective small twisting of the torsion members extending in one of said perpendicular directions.

7. An angle adjusting mechanism for an optical element, comprising: an optical element housing; torsion means attached to said housing and extending along a given direction for permitting rotation of said housing about said given direction; a leaf spring attached at one end thereof to said housing and extending in a direction perpendicular to said given direction, said spring being folded back at the free end thereof; and means for driving said leaf spring at a point on the folded back portion thereof which is substantially 0.414 times the distance between the point at which said leaf spring attaches to said optical element housing and the point at which said leaf spring is folded back, thereby maintaining the angle of attack between said driving means and said leaf spring at a right angle in order to insure a linear relationship between the translation of said driving means and the rotation of said housing about said given direction.

8. An angle adjusting mechanism for an optical element, comprising: an optical element housing; torsion means attached to said housing for permitting rotation of said housing about a given direction; an elongated member attached at one end thereof to said housing and extending in a direction perpendicular to said given direction; and a micrometer mechanism comprising a rotating spindle, a driving spindle axially aligned with and separated from said rotating spindle for driving the free end of said elongated member, and a housing coaxial with and in bearing relationship with said spindles, said spindles making contact with each other over an area which is small compared to the area of bearing contact between said driving spindle and said housing whereby said driving spindle does not rotate as it is axially translated, thereby insuring that said elongated member develops a rotation of said optical element housing only about said given direction.

References Cited

UNITED STATES PATENTS 3,204,471  9/1965  Rempel _____ 74—89.15

MILTON KAUFMAN, *Primary Examiner.*